June 20, 1961

R. M. CROOKER 2,989,630

TUNING APPARATUS

Filed Oct. 14, 1957

INVENTOR.

Robert M. Crooker

BY Mueller & Aichele

Attys.

United States Patent Office 2,989,630
Patented June 20, 1961

2,989,630
TUNING APPARATUS

Robert M. Crooker, Park Ridge, Ill., assignor to Motorola, Inc., Chicago, Ill., a corporation of Illinois Filed Oct. 14, 1957, Ser. No. 690,146
3 Claims. (Cl. 250—40)

This invention relates generally to frequency selective devices for electrical signals, and more particularly to a tuner for electronic apparatus which operates in the very high and ultra high frequency ranges.

Radio receivers and other electronic devices require frequency selective circuits for picking out signals of a predetermined frequency from other signals which may be present. Variable resonant or tuned circuits can be used for this purpose and at low frequencies, variable capacitors or inductors may be included in the circuits to permit tuning them over a range of frequencies. For operation at higher frequencies, such as in the very high frequency range and the lower portion of the ultra high frequency range, the inductances required in the circuits are quite small. In order to maintain a favorable inductance to capacity ratio, the capacity must also be small. Accordingly, the circuit capacities form a considerable portion of the capacity, and it is therefore difficult to obtain a wide variation in capacity to provide a circuit which may be tuned over a wide frequency range. It has been proposed to simultaneously vary the capacity and inductance of a circuit in order to provide a wide range of tuning, but devices for accomplishing this have been relatively expensive to construct and have been quite critical in adjustment.

It is an object of the present invention to provide an improved and simplified tuner for high frequency use.

A further object of the invention is to provide a simple coaxial structure which forms a variable inductance and a variable capacitor with both elements being simultaneously adjusted in a sense to provide tuning over a wide frequency range, while providing a linear or any other desired characteristic between frequency and movement of the structure.

Another object of the invention is to provide a high frequency tuner having variable capacity and inductance which is compensated for changes in temperature so that its resonant frequency is maintained relatively stable with variations in temperature.

A feature of the invention is the provision of a coaxial structure including relatively movable members having conducting portions forming a capacitor and at least one coil portion, with the members being movable to vary the capacity between the conducting portions and to vary the effective inductance of the coil.

Another feature of the invention is the provision of a coaxial tuner structure including elements forming inductance and capacitance connected in a parallel tuned circuit, with a pair of shaped conducting surfaces forming a capacitor being relatively movable to vary the capacity thereof as a function of axial movement and surface shape, and with one of the conducting surfaces being movable into a coil to reduce the inductance thereof.

A further feature of the invention is the provision of a coaxial tuner including a tubular member having spaced conducting coatings thereon interconnected by a helical coating forming a coil, and a cylindrical plunger member having similarly spaced interconnected conducting coatings, with the member being movable so that the conducting coatings are moved into and out of registry with each other to change the capacity, and a conducting coating on the plunger may be moved into the coil to reduce the inductance thereof. A high permeability section may be provided between the conducting coatings on the plunger member to increase the inductance of the coil when the capacity is maximum. Alternately, a coil portion may be provided between the conducting coatings of the plunger member for connecting the conducting portions, and the mutual inductance between the coil portions on the tubular member and on the plunger member will be maximum when the capacity is maximum because they are wound to be series aiding.

Further objects, features, and the attending advantages of the invention will be apparent from a consideration of the following description when taken in connection with the accompanying drawings, in which.

In practicing the invention, there is provided a coaxial tuning structure including a tubular member and a cylindrical plunger member movable with respect to each other. The tubular member may preferably be fixed and the cylindrical member movable. The tubular member has spaced conducting portions about its circumference which are interconnected by a coil. These may be formed by the use of an insulating tube with conducting coatings thereon joined by a helical conducting strip. The cylindrical plunger member includes electrically connected cylindrical conducting portions which are spaced in the same way as the conducting portions on the tubular member. These conducting portions may be provided by insulating forms with conducting coatings. It will be apparent that when the conducting portions on the plunger are aligned with the conducting portions on the tubular member, the capacity between the conducting portions will be maximum. This capacity is in effect connected across the coil to form a parallel tuned circuit. As the plunger is moved, the capacity decreases and one of the conducting portions on the plunger will move into the coil to reduce the inductance of the coil. Accordingly, the capacity and inductance are simultaneously reduced to increase the resonant frequency. The shape of the conducting portions may be such that a linear change of frequency versus travel is obtained.

A high permeability portion may be provided on the plunger between the conducting portions which will be positioned within the coil when the conducting portions are aligned and this will increase the inductance of the coil. As the plunger is moved, the permeability section will move out of the coil to reduce the inductance so that a greater tuning range is provided.

In an alternate form, one of the coatings on the tubular member has an extent twice that of the conducting portion on the plunger with which it cooperates so that there is no change in capacity at this end as the plunger moves. The variable capacity element exists at the other end of the plunger and tubular member. In this embodiment, the two conducting portions on the plunger may be connected by a coil and this coil is wound so that the mutual inductance between the coil on the outer member and the coil on the plunger is maximum when the coils are aligned with each other. The inductance then decreases as the coils each move into registry with a conducting portion on the opposite member, so that the inductance of the coils is minimum when the capacity is minimum. This again provides maximum frequency range for the tuner.

Figure 1:
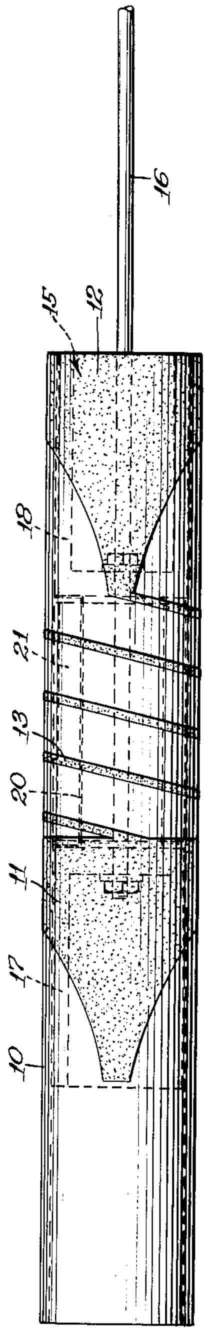
FIG. 1 illustrates one form of the coaxial tuner in accordance with the invention.
Figure 2:
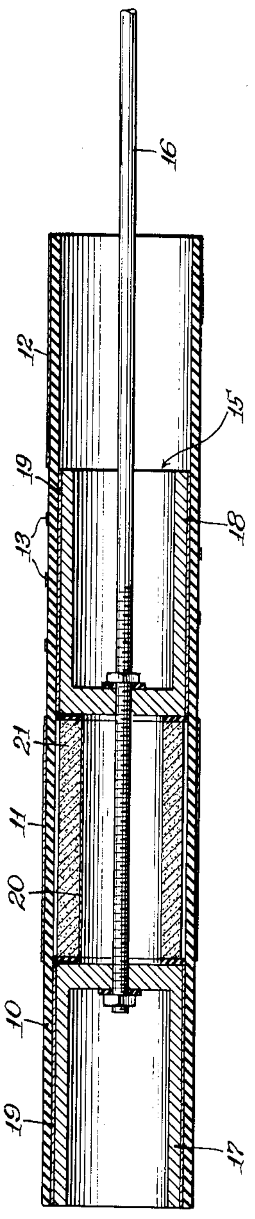
FIG. 2 is a cross-sectional view of the tuner of FIG. 1.

Referring now to the drawings, in FIG. 1 there is shown a coaxial tuner including an outer insulating tubular member 10 on which is provided conducting coatings 11, 12, and 13. Coating 11 extends from a minimum width at the left end to a maximum width at its right end where it extends almost entirely about the insulating member 10. Conducting coating 12 has the same configuration as the conducting member 11. The coating 13 is a helix which joins the conducting coatings 11 and 12 and forms an inductance coil. The plunger 15 which extends within the tubular member 10 is shown in one position in FIG. 1, and is shown in more detail in a second position in FIG. 2. The plunger includes a rod 16 on which are fastened two cup shaped members 17 and 18. These members may either be made of conducting material or of insulating material with a conducting coating 19 on the surface. The conducting coatings or surfaces of the members are interconnected by conductor 20. Positioned between the conducting portions 17 and 18 is a high permeability portion 21 which may be made of a powdered iron material. It may be desired in some applications to omit this member and provide an insulating spacer between the conducting portions.

Figure 3:
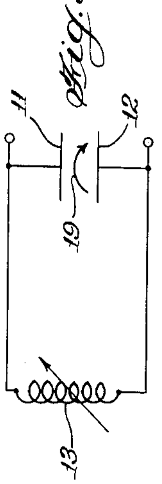
FIG. 3 shows the equivalent electrical circuit of the tuner of FIG. 1.

FIG. 3 shows the equivalent electrical circuit of the structure of FIG. 1. The same numerals are applied to the circuit elements as to the structural elements in FIGS. 1 and 2. The coil 13, formed by the conducting strip 13 on the form 10 of FIG. 1, is connected in parallel with the capacitors formed by the conducting coatings 11 and 12 on the form 10 and by the conducting coatings 19 on the members 17 and 18. Connection to the unit is made by connection to the coatings 11 and 12.

With the plunger positioned as shown in FIG. 1, the capacity between the coating 11 and the coating 19 on the member 17 is a maximum since the conducting coatings are coextensive. Similarly, the capacity between coating 12 and the coating 19 on the member 18 is a maximum. The inductance of coil 13 is also maximum in this position since the high permeability member 21 is fully positioned within the coil. This position of the plunger within the outer tubular member provides the lowest resonant frequency of the parallel resonant circuit. As the plunger is moved to the left so that the plunger takes the position shown in FIG. 2 (but still remaining within the tubular member) the coatings 19 on the plunger are completely disaligned with the coatings 11 and 12 on the tubular member so that the capacity therebetween is a minimum. The high permeability portion 21 is moved out of the coil 13 to reduce its inductance and the conducting coating 19 is now positioned within the coil 13 to further reduce its inductance. The coating 19 forms a short circuited turn which through mutual inductive coupling greatly reduces the inductance of the coil 13. Accordingly, when the plunger is in this position, the parallel tuned circuit is tuned to the highest frequency to which the tuner may be resonant. By properly shaping the coatings 11 and 12 and the configuration of the turns of the coil 13, a straight line frequency response may be provided with movement of the plunger by the rod 16.

When a high order of stability of the tuned circuit is required, and the equipment is subject to wide changes in temperature, this can be compensated for by the use of an actuating rod having a desired temperature characteristic. For example, the rod may be selected having a positive temperature coefficient of expansion so that it expands with increasing temperature to move the piston further in the direction of increased frequency to compensate for decreasing frequency resulting from an increase in temperature. Also, the shaping of the connecting coatings may be varied to provide a response differing somewhat from linear to provide tracking with other circuits to which the tuner may be coupled.

Figure 6:
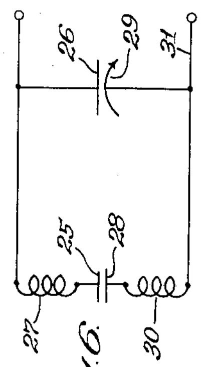
FIG. 6 is the equivalent electrical circuit of the tuner of FIG. 4.
Figure 4:
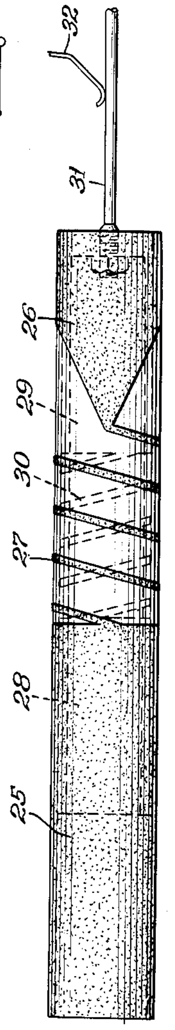
FIG. 4 illustrates a second embodiment of the tuner.
Figure 5:
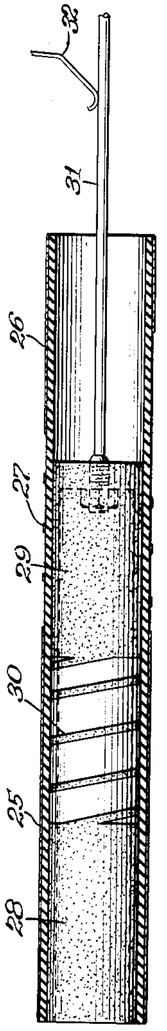
FIG. 5 is a view of the tuner of FIG. 4 showing the construction of the plunger.

FIGS. 4, 5, and 6 show a somewhat different embodiment of the coaxial tuner structure. In this structure, the outer member may include an insulating tube as in FIG. 1 with spaced conducting coatings 25 and 26 which are interconnected by a coil portion 27. The plunger again includes spaced conducting portions 28 and 29 and these are connected by a coil portion 30. It is to be noted that in the structure of FIG. 4, the coating 25 is a full cylindrical coating around the form and is twice the length of the conducting coating 28 on the plunger. The coating 26 is generally similar to the coatings 11 and 12 of FIG. 1.

The tuner of FIGS. 4, 5, and 6 also forms a parallel tuned circuit as shown in FIG. 6. FIG. 6 shows the equivalent circuit with the coils and plates of the capacitor being numbered as in FIGS. 4 and 5. Connections may be made to coating 26 on the outer member and through operating rod 31 to the coating 29 on the plunger. A sliding contact 32 engages the operating rod 31 to complete this connection.

When the plunger is aligned in the outer member as shown in FIG. 4, the coating 29 is within the coating 26 to provide maximum capacity. Maximum capacity is also provided between the coatings 25 and 28. As the plunger is moved to the left, the capacity between coatings 26 and 29 decreases, as the coating 29 moves out of the coating 26. However, coating 25 extends sufficiently that the coating 28 always remains therein so that the capacity between these elements is substantially fixed. When the plunger is positioned as shown in FIG. 4, the mutual inductance between coils 27 and 30 is maximum so that inductance of the parallel branch of the circuit including coils 27 and 30 and the capacity between coatings 25 and 28 is a maximum. At this point, the capacity between coatings 26 and 29 which forms the other parallel branch is also a maximum as previously stated. This provides the lowest frequency of the tuner.

When the plunger is moved to the left to the position shown in FIG. 5, the capacity between coatings 26 and 29 is a minimum. As previously stated, the capacity between coatings 25 and 28 remains constant. In this position, the coating 29 extends within the coil 27 and forms a shorted turn therein to greatly reduce the inductance of the coil. Similarly, the coating 25 is positioned about the coil 30 and also forms a shorted turn about the coil to reduce its inductance. Accordingly, the inductance of both coils 27 and 30 is greatly reduced and this, together with the reduction in capacity between coatings 26 and 29, provides the highest frequency to which the tuner is resonant.

Accordingly, it will be seen that the effect of the tuner of FIG. 4 is generally similar to that of FIG. 1. In both cases, parallel tuned circuits are provided. The capacity between coatings 25 and 28 serves as the means for connecting the two windings 27 and 30. This capacity is made as large as possible, so that its reactance is small compared with the sum of the reactances of the two coils. Therefore, this capacity does not greatly reduce the maximum value of inductance that can be obtained.

It is therefore seen that the coaxial tuners in accordance with the invention provide a very wide tuning range. As both the inductance and capacity of the parallel tuned circuit are varied at the same time, and in the same sense, the tuning effects are cumulative to provide a wide range of frequencies. As the inductance and capacity are varied together, the inductance to capacity ratio remains substantially constant so that the dynamic resistance of the tuned circuit remains substantially constant. This has a highly desirable effect in the system in which the tuned circuit is used.

The construction of the tuner as a single coaxial unit makes the unit simple and inexpensive. As at least one of the capacity plates serves the additional function of a shorted turn for reducing the inductance, the number of parts is minimized. The tuner is suitable for use at very high and ultra high frequencies, and the elements of the unit are not critical to require difficult adjustment or maintenance.

I claim:

1. A coaxial high frequency tuner including first and second members with one of said members being tubular and the other member being cylindrical and movable within said tubular member, said first member including an insulating tubular form having first and second spaced conducting coatings thereon, a helical conducting coating on said tubular form joining said first and second coatings and forming a first inductance coil connected therebetween, said second member having first and second cylindrical conducting portions axially spaced to correspond to the spacing of said first and second conducting coating of said first member, said conducting coatings of said first member and said conducting portions of said second member forming first and second capacitors having maximum capacity when said coatings and said portions are aligned, said second member including means forming a second inductance coil extending between and connected to said conducting portions thereof, said first and second coils being adjacent each other when said conducting coatings and portions are aligned to provide mutual inductance to increase the effective inductance of said coils, said members having a position in which said conducting portions are removed from said conducting coatings so that said capacitors have minimum capacity, and one of said cylindrical conducting portions of said second member is adjacent said first coil and one of said conducting coatings of said first member is adjacent said second coil to reduce the inductance thereof.

2. A coaxial high frequency tuner including first and second members with one of said members being tubular and the other member being cylindrical and movable within said tubular member, said first member having first and second spaced and insulated conducting portions thereon, at least one of said conducting portions being cylindrical, means forming an inductance coil positioned between said first and second portions and having opposite ends electrically connected to said first and second conducting portions, said second member having first and second electrically interconnected conducting portions spaced to correspond to the spacing of said conducting portions of said first member, means forming an inductance coil positioned between said first and second portions of said second member and having opposite ends electrically connected to said conducting portions thereof, said electrically conducting portions of said first and second members forming first and second capacitors, said conducting portion of said second member not associated with said one conducting portion of said first member being cylindrical, said first and second members having a first relative position in which said conducting portions thereof are aligned and a second relative position in which said cylindrical conducting portion of said first member is aligned with said coil of said second member and said cylindrical conducting portion of said second member is aligned with said coil of said first member, said capacitors having maximum capacity and said coils having maximum inductance when said members are in said first relative position with said coils having maximum mutual inductance, said capacitors having minimum capacity and said coils having minimum inductance when said members are in said second relative position with said cylindrical conducting portions reducing the inductance of said coils, at least one of said conducting portions being shaped so that the frequency of the tuner varies as a function of such shape and with the movement of said members between said first and second relative positions.

3. A coaxial high frequency tuner including first and second members with one of said members being tubular and the other member being cylindrical and movable within said tubular member, said first member having a first cylindrical conducting portion and a second conducting portion spaced from said first portion, means forming a first inductance coil positioned between said first and second portions and having opposite ends electrically connected to said first and second conducting portions, said second member having third and fourth spaced cylindrical conducting portions, means forming a second inductance coil positioned between said third and fourth portions of said second member and having opposite ends electrically connected to said third and fourth conducting portions, said second, third, and fourth conducting portions and said first and second inductance coils having substantially the same axial extent, and said first conducting portion having an axial extent substantially twice that of said third conducting portion, said first and third conducting portions forming a first capacitor and said second and fourth conducting portions forming a second capacitor, said first and second members having a first relative position in which said second and fourth conducting portions thereof and said first and second coils thereof are aligned and a second relative position in which said coil of said first member is aligned with said fourth conducting portion of said second member, said capacitors having maximum capacity and said coils having maximum inductance when said members are in said first relative position with said coils having maximum mutual inductance, said capacitors having minimum capacity and said coils having minimum inductance when said members are in said second relative position with said first and fourth conducting portions reducing the inductance of said coils said second conducting portion of said first member being shaped so that the capacity variation produced by movement of said second member with respect to said first member causes a variation in frequency of the tuner which is substantially linear with such movement, and an actuating rod connected to said second member for moving the same from said first position toward said second position, said rod having a positive coefficient of expansion so that it lengthens sufficiently with increasing temperature to move said second member further toward said second position.

References Cited in the file of this patent

UNITED STATES PATENTS

| | | |
|---|---|---|
| 1,913,978 | Ewen | June 13, 1933 |
| 2,147,425 | Bock | Feb. 14, 1939 |
| 2,394,391 | Martowicz | Feb. 5, 1946 |
| 2,637,782 | Magnuski | May 5, 1953 |
| 2,698,387 | Schuster | Dec. 28, 1954 |
| 2,705,288 | Wallin | Mar. 29, 1955 |